US006850947B1

(12) United States Patent
Chung et al.

(10) Patent No.: US 6,850,947 B1
(45) Date of Patent: Feb. 1, 2005

(54) METHOD AND APPARATUS WITH DATA PARTITIONING AND PARALLEL PROCESSING FOR TRANSPORTING DATA FOR DATA WAREHOUSING APPLICATIONS

(75) Inventors: Dwayne Chung, Richmond, CA (US); Gautam H. Mudunuri, Union City, CA (US); Fayyaz Younas, Fremont, CA (US); Lillian S. Lim, Sunnyvale, CA (US); Renjie Tang, San Jose, CA (US); Steve Carlin, Sunnyvale, CA (US); Subramanya Madapura, Milpitas, CA (US)

(73) Assignee: Informatica Corporation, Redwood City, CA (US)

( * ) Notice: Subject to any disclaimer, the term of this patent is extended or adjusted under 35 U.S.C. 154(b) by 294 days.

(21) Appl. No.: 09/637,335

(22) Filed: Aug. 10, 2000

(51) Int. Cl.⁷ .............................................. G06F 17/00

(52) U.S. Cl. .................................................... 707/101

(58) Field of Search ................... 707/1–10, 100–104.1, 707/200–205

(56) References Cited

U.S. PATENT DOCUMENTS

| | | | | |
|---|---|---|---|---|
| 6,065,007 A | * | 5/2000 | Muthukrishnan et al. | 382/168 |
| 6,122,628 A | * | 9/2000 | Castelli et al. | 707/2 |
| 6,173,310 B1 | * | 1/2001 | Yost et al. | 709/201 |
| 6,208,990 B1 | * | 3/2001 | Suresh et al. | 707/6 |
| 6,216,125 B1 | * | 4/2001 | Johnson | 705/52 |
| 6,385,604 B1 | * | 5/2002 | Bakalash et al. | 707/10 |
| 6,408,292 B1 | * | 6/2002 | Bakalash et al. | 707/100 |

FOREIGN PATENT DOCUMENTS

| | | | |
|---|---|---|---|
| WO | WO 00/04466 | 1/2000 | G06F/17/30 |

OTHER PUBLICATIONS

Jones, Katherine, "An Introduction to Data Warehousing: What Are the Implications for the Network", 1998, International Journal of Network Management, vol. 8 pp. 42–56.*
Bellatreche L. et al.: "OLAP query processing for partitioned data warehouses"; Proceedings 1999 Intl symposium on database Application in Non–Traditional Environments (Dante'99) (Cat. No. PR00496), Kyoto, JP Nov. 28–30, 1999, pp. 35–42, XP01037691 IEEE comput. Soc. Los Alamitos, CA US ISBN 0–7695–0496–5, p. 35, right–hand column, paragraph 2, p. 36, right–hand column, line 14–line 16, p. 38, right–hand column, paragraph 1.
Ballinger C. et al.: "Born to be parallel, Why parallel origins give Teradata an enduring performance edge" Bulletin of the technical committee on data Engineering vol. 20, No. 2, Jun. 1997, XP002225741 IEEE Comput Soc., Los Alamitos, CA, US p. 8, line 21–line 39.
Mohania M. et al: "Advances and research directions in data warehousing technology" AJIS Australian Journal of Information Systems, vol. 7. No. 1. Sep. 1999, pp. 41–59, XP000978044 Wollongong, Au ISSN: 1039–7841 p. 53, paragraph 1, paragraph 2, p. 56, paragraph 2.

* cited by examiner

Primary Examiner—Greta Robinson
Assistant Examiner—S R Pannala

(57) ABSTRACT

A method and apparatus for transporting data for a data warehouse application is described. The data from an operational data store (the source database) is organized in non-overlapping data partitions. Separate execution threads read the data from the operational data store concurrently. This is followed by concurrent transformation of the data in multiple execution threads. Finally, the data is loaded into the target data warehouse concurrently using multiple execution threads. By using multiple execution threads, the data contention is reduced. Thereby the apparatus and method of the present invention achieves increased throughput.

22 Claims, 6 Drawing Sheets

METHOD AND APPARATUS WITH DATA PARTITIONING AND PARALLEL PROCESSING FOR TRANSPORTING DATA FOR DATA WAREHOUSING APPLICATIONS

FIELD OF THE INVENTION

The present invention relates to database systems. More particularly, the present invention pertains to an apparatus and method for transporting data for a data warehousing application that increases throughput.

BACKGROUND OF THE INVENTION

Due to the increased amounts of data being stored and processed today, operational databases are constructed, categorized, and formatted in a manner conducive for maximum throughput, access time, and storage capacity. Unfortunately, the raw data found in these operational databases often exist as rows and columns of numbers and code which appears bewildering and incomprehensible to business analysts and decision makers. Furthermore, the scope and vastness of the raw data stored in modem databases renders it harder to analyze. Hence, applications were developed in an effort to help interpret, analyze, and compile the data so that a business analyst may readily and easily understand it. This is accomplished by mapping, sorting, and summarizing the raw data before it is presented for display. Thereby, individuals can now interpret the data and make key decisions based thereon.

Extracting raw data from one or more operational databases and transforming it into useful information is the function of data "warehouses" and data "marts." In data warehouses and data marts, the data is structured to satisfy decision support roles rather than operational needs. Before the data is loaded into the target data warehouse or data mart, the corresponding source data from an operational database is filtered to remove extraneous and erroneous records; cryptic and conflicting codes are resolved; raw data is translated into something more meaningful; and summary data that is useful for decision support, trend analysis or other end-user needs is pre-calculated. In the end, the data warehouse is comprised of an analytical database containing data useful for decision support. A data mart is similar to a data warehouse, except that it contains a subset of corporate data for a single aspect of business, such as finance, sales, inventory, or human resources. With data warehouses and data marts, useful information is retained at the disposal of the decision-makers.

One major difficulty associated with implementing data warehouses and data marts is that a significant amount of processing time is required for performing data transport operations. Because transport processes (data extraction, transformation, and loading) consume a significant amount of system resources, unless transport processes are scheduled to occur during specific time windows during which the operational databases are processing the minimum amount of transactional data, the performance of the operational databases are seriously compromised. In recent data warehouse implementations, because the process of data transport slows down the operational databases, some organizations leave a small nightly window for the data transport process, such as from one to two in the morning.

Because of increasing demands for after-hours database usage and expanded operational hours, there is a need to further increase the throughput of the data transport process in order to assure that the data transport operation does not interfere with the operation of the operational database. Furthermore, in keeping with the proliferation of data mining software applications that capture the rich data patterns hidden inside the data warehouses, some organizations might even require hourly refreshes. Thus, the approaches for non-invasive data transport now focus on increasing the throughput of data transporting process, whereby the whole data transport process can be completed within the narrow time windows allowed. In other words, the pursuit of optimizing throughput (i.e., speed) has begun.

To improve throughput, recent data warehouse application programs that perform data transport functions have relied on the use of multiple fast microprocessors. However, these recent data warehouse application programs use a single pipeline that includes multiple dependent process threads for performing extraction, transformation and loading operations. The use of multiple processors gives significantly improved processing speed and a corresponding increase in throughput. However, these prior art applications do not fully take advantage of the capabilities of the multiple processor environment. For example, delays in read operations slow down the entire process. Furthermore, because of the interdependencies between process threads within the single pipeline, delays affecting one microprocessor are propagated to all of the other processors, resulting in further delays. Thus, in spited of the use of increasingly powerful computers and the use of multiple microprocessors, data transport operations still consume an excessive amount of processing resources and processing time.

What is needed is a method and apparatus for transporting data for data warehousing applications that increases throughput. In addition, a method and apparatus is required that meets the above need and that takes full advantage of the use of a multiple processor environment. The present invention provides a method and apparatus that meets the above needs.

SUMMARY OF THE INVENTION

The present invention includes a method and apparatus for transporting data for a data warehousing application. More particularly, the present invention introduces a data transport process architecture that uses multiple partitions of source data and multiple pipelines for achieving improved throughput for extraction, transformation, and loading in a data warehousing application.

Source databases are operational databases from which raw data is to be extracted. In one embodiment of the present invention, a transformation server that is coupled to a source database organizes data from a source database into multiple non-overlapping partitions of source data. In the present embodiment, the partitions are user-defined.

Multiple pipelines are then constructed that include transformation components for manipulating the partitioned data. In the present embodiment, transformation components are constructed and are coupled together to form multiple pipelines. The pipeline structure is organized to minimize data sharing between pipelines and to provide a maximum amount of parallel processing.

Target databases are data warehouses and/or data marts into which transformed data is loaded. In the present embodiment, one or more target database is specified for storing the data generated by the pipelines.

Data transport operations extract data from the source database, transform the data, and load the transformed data into the target database. The term "data transport" and "data transportation" as used herein includes data extraction, transformation, and loadinlg. In the present embodiment, tasks are executed in parallel through the pipelines to extract, transform, and load data.

In the present embodiment, execution threads or processes read the data from the operational data store concurrently, followed by concurrent transformation of the data in multiple execution threads, and concurrent loading of data into the target data warehouse using multiple execution threads or processes.

The use of data partitions gives non-overlapping, independent sets of data from which either a single or multiple pipeline(s) can process data. This allows for definition of pipelines to minimize data sharing between pipelines. By minimizing data sharing between pipelines, independent processing of data is possible, preventing delays due to dependent operations such as, for example, the concurrent read operations of prior art systems.

Each pipeline of transformations constitutes an independent unit for which the transformation server can dedicate one or more threads or processes. Thereby, a computer having multiple microprocessors can realize its full potential of parallelism in optimizing extraction, transformation, and loading throughput. Furthermore, because the data partitioning structure is user-defined, the user can customize the extent of parallelism desired, thus taking full advantage of the parallel processing capabilities of the underlying computer hardware system.

Thereby, the method and apparatus of the present invention provides increased throughput for data transport operations for data warehouse applications. In addition, the method and apparatus of the present invention takes full advantage of the multiple processor environment of a parallel hardware platform, thus optimizing throughput.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

An apparatus and method for transporting data for a data warehousing application is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "partitioning", "constructing", "specifying", "receiving" or the like, can refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Figure 1:
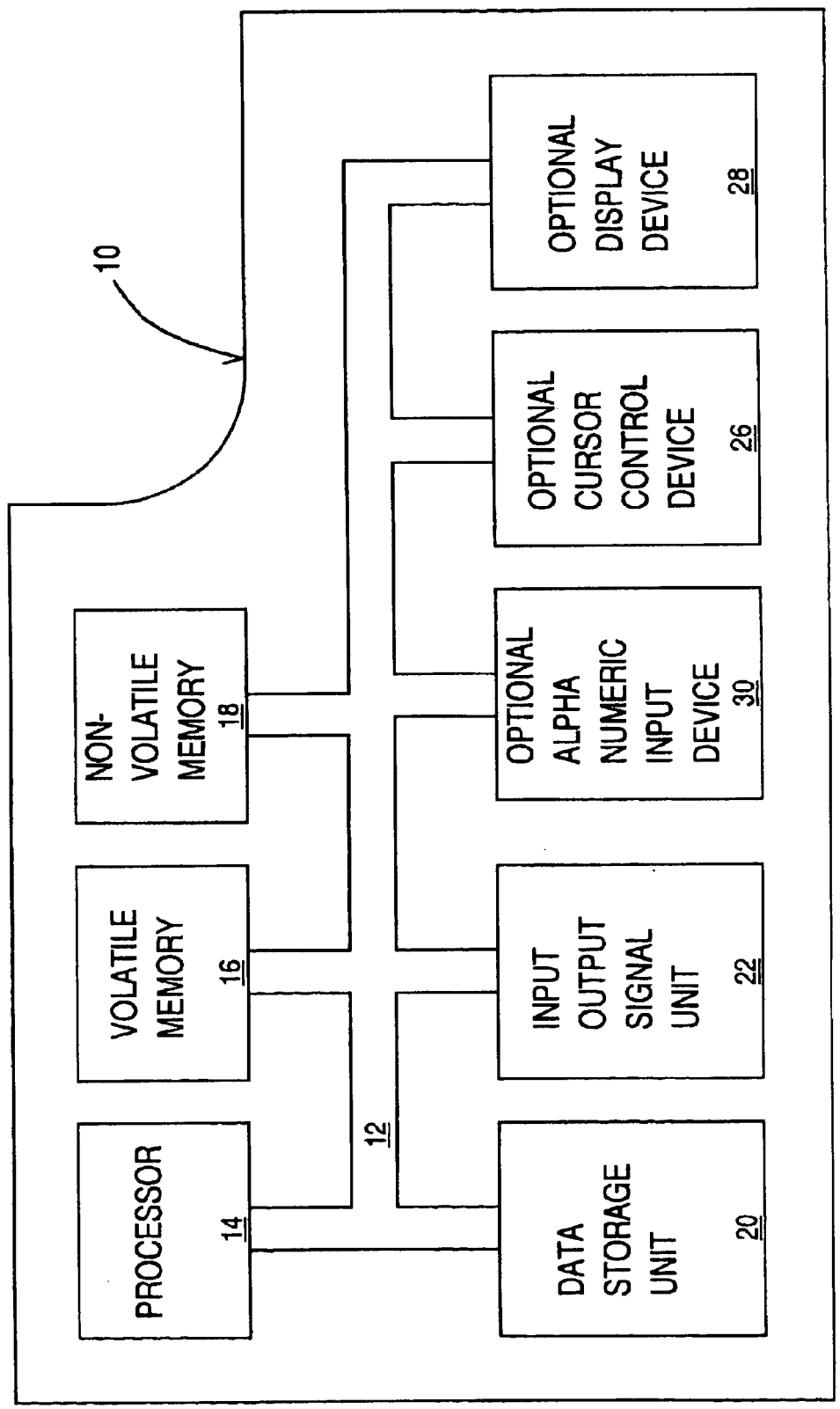
FIG. 1 illustrates an exemplary computer system used as part of a data warehousing system in accordance with one embodiment of the present invention.

With reference to FIG. 1, portions of the present invention are comprised of the computer-readable and computer executable instructions which reside, for example, in computer system 10 used as a part of a data warehousing system in accordance with one embodiment of the present invention. It is appreciated that system 10 of FIG. 1 is exemplary only and that the present invention can operate within a number of different computer systems including general-purpose computer systems, embedded computer systems, and stand-alone computer systems specially adapted for data warehousing applications. Computer system 10 includes an address/data bus 12 for conveying digital information between the various components, a central processor unit (CPU) 14 for processing the digital information and instructions, a main memory 16 comprised of volatile random access memory (RAM) for storing the digital information and instructions, a non-volatile read only memory (ROM) 18 for storing information and instructions of a more permanent nature. In addition, computer system 10 may also include a data storage unit 20 (e.g., a magnetic, optical, floppy, or tape drive) for storing vast amounts of data, and an I/O interface 22 for interfacing with peripheral devices (e.g., computer network, modem, mass storage devices, etc.). It should be noted that the software program for performing the transport process can be stored either in main memory 16, data storage unit 20, or in an external storage device. Devices which may be coupled to computer system 10 include a display device 28 for displaying information to a computer user, an alphanumeric input device 30 (e.g., a keyboard), and a cursor control device 26 (e.g., mouse, trackball, light pen, etc.) for inputting data, selections, updates, etc.

Furthermore, computer system 10 may be coupled in a network, such as in a client/server environment, whereby a number of clients (e.g., personal computers, workstations, portable computers, minicomputers, terminals, etc.), are used to run processes for performing desired tasks (e.g., inventory control, payroll, billing, etc.).

Figure 2:
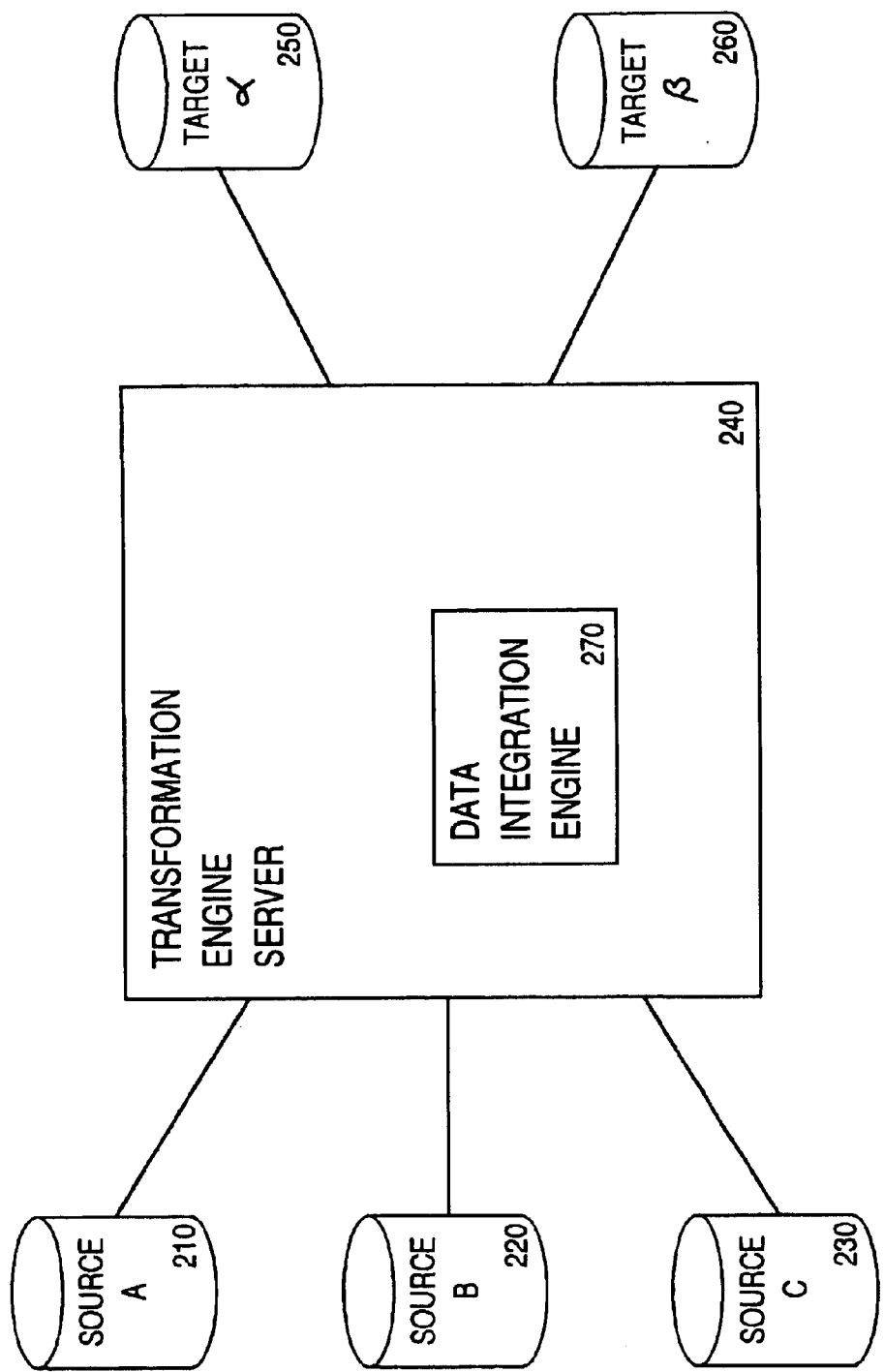
FIG. 2 illustrates an exemplary architecture that includes a transformation engine server in accordance with one embodiment of the present invention.

FIG. 2 illustrates an exemplary computer network upon which an embodiment of the present invention may be practiced. Operational databases 210, 220, and 230 store data resulting from business and financial transactions, and/or from equipment performance logs. These databases can be any of the conventional RDMS systems (such as from Oracle, Informix, Sybase, Microsoft, etc.) that reside within a high capacity mass storage device (such as hard disk drives, optical drives, tape drives, etc.). Databases 250 and 260 are the data warehouses or data marts that are the targets of the data transportation process.

Data integration engine 270 is a functional element, that can be implemented in software and/or hardware for performing data transport operations. In the present embodiment, data integration engine 270 is a software program, operable on transformation engine server 240, that performs data transport operations. That is, in the present embodiment, data from databases 210, 220, and 230 is extracted, transformed, and loaded by transformation engine server 240 into databases 250 and 260. In the present embodiment, transformation engine server 240 includes one or more microprocessor on which an operating program such as, for example, Windows, NT, UNIX, or other operating program runs.

Figure 3:
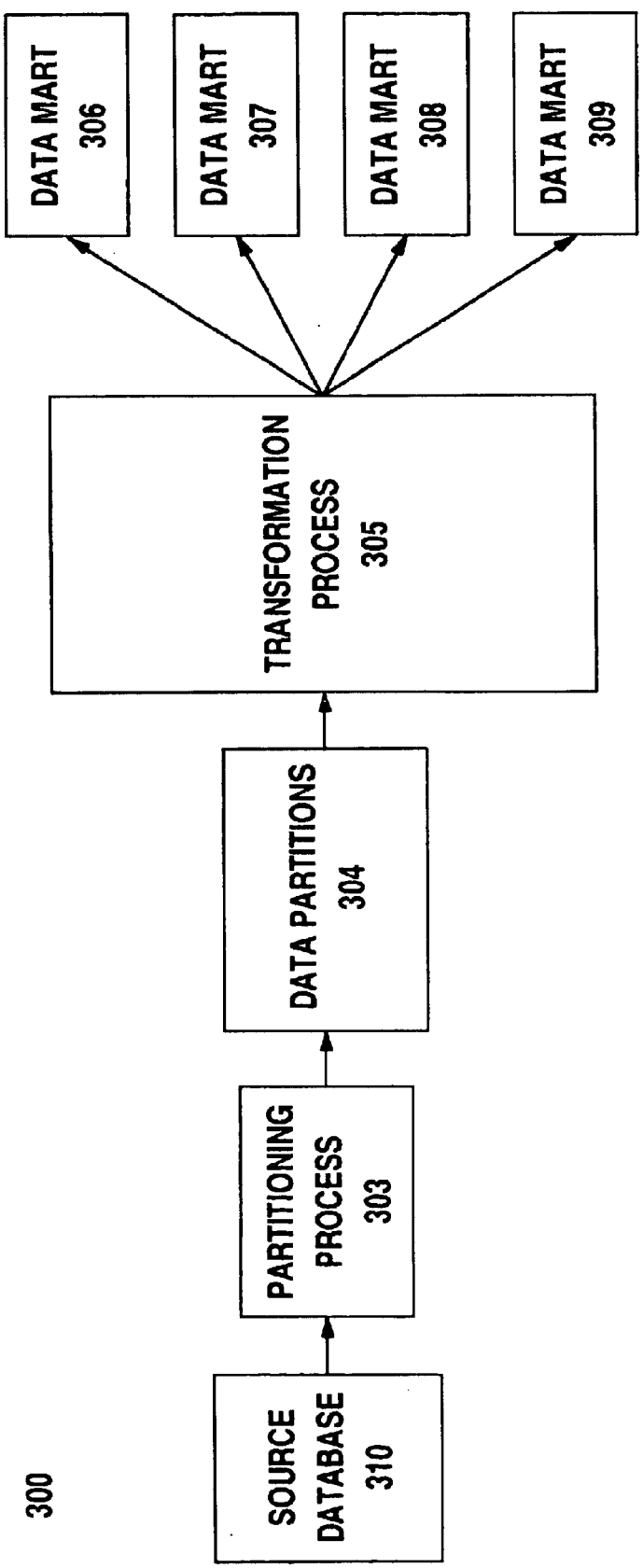
FIG. 3 illustrates the process flow of a data extraction, transformation, and loading process in accordance with one embodiment of the present invention.

FIG. 3 shows a representation of a process flow 300 in accordance with one embodiment of the present invention. Referring now to block 301, a partitioning process is performed on data from source database 310 to form data partitions 304. Transformation processes, shown generally as transformation process 305, perform transformations on the data and couples the output to data marts 306–309. Though the process illustrated in FIG. 3 is shown to utilize a single source database 310, alternatively, data from multiple source databases could be processed using partitioning process 301 to obtain data partitions 304. Similarly, transformation process 305 could couple data to a single data mart or to more or fewer data marts.

Figure 4:
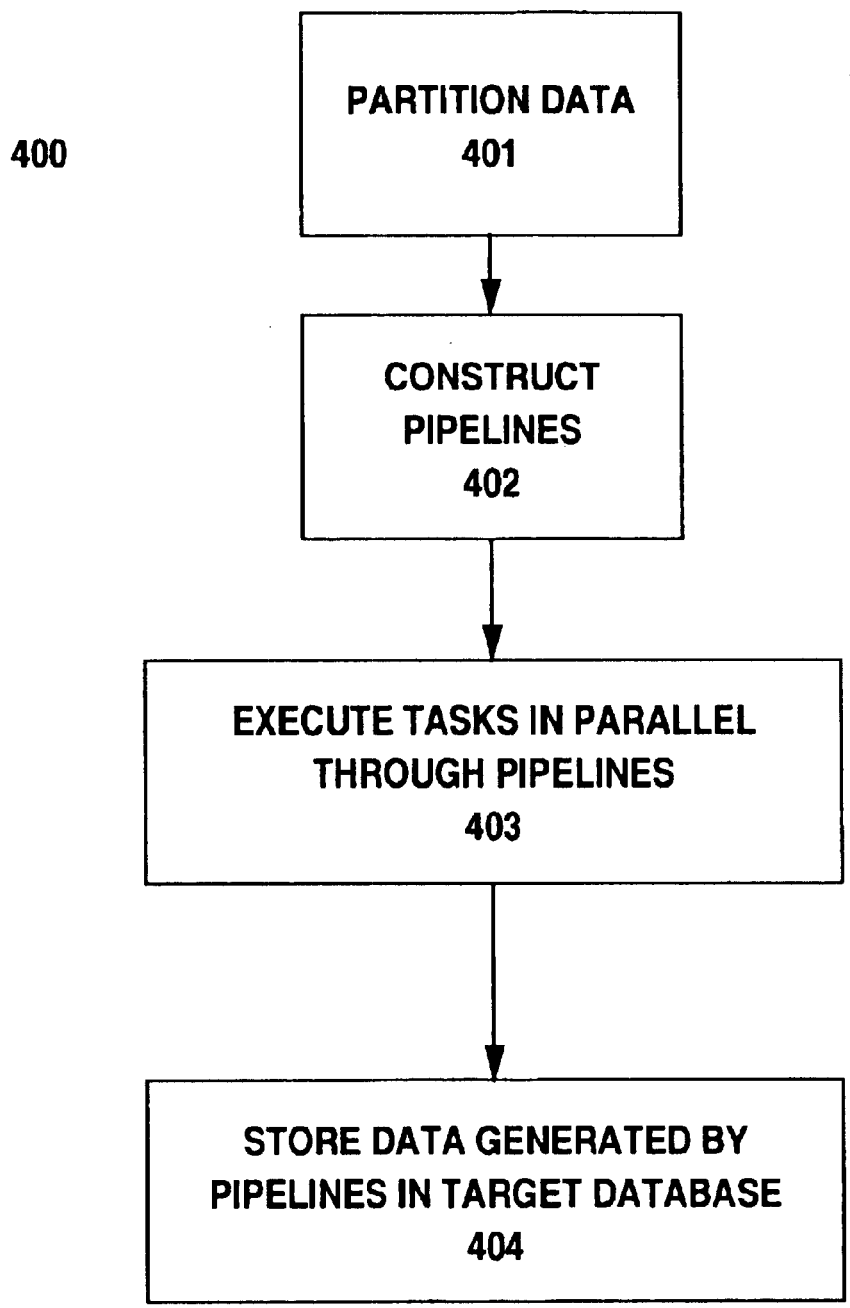
FIG. 4 illustrates a method for transporting data in a data warehousing application in accordance with one embodiment of the present invention.

FIG. 4 shows a method for transporting data in a data warehousing application in accordance with the present invention. First, as shown by step 401 data is partitioned. That is, data is extracted from the source database and is partitioned into data partitions. In the present embodiment, data partitions are non-overlapping. That is, data that is included within a particular data partition is not duplicated in any other data partition. In one embodiment, partitioned data is then stored locally such that the data partitions are readily available. Alternatively, data partitions are only stored to the extent necessary for the staging of data to accomplish the desired transformations on the source data.

Continuing with step 401 of FIG. 4, in the present embodiment, data partitions are user defined. In one embodiment, the user is prompted, by means of a graphical user interface selection mechanism to define data partitions. The received user input is then used to structure the extracted source data into partitions. Though any of a number of methods can be used to define data partitions, in one embodiment of the present invention, data partitions are defined by evenly dividing data into a user-defined number of data partitions. The present embodiment also allows for data partitioning using key ranges, referred to hereinafter as "key range partitioning" that partitions data based on key ranges within a source data base (e.g. the key ranges of Oracle and Sybase databases).

In the present embodiment, data is partitioned such that there is affinity of data within each partition. That is, related data is grouped together. For example all data for a particular geographic region (e.g., by continent, nationality, state, region, city, etc.) could be partitioned into a data partition. Alternately, data can be related by broad product categories, product categories, functional units of an organization, geographic units of an organization, etc.

Pipelines for performing data transformations and loading are then constructed as shown by step 402. In the present embodiment pipelines are constructed so as to minimize data sharing. That is, many pipelines are used, with parallel pipelines performing identical or different processes such that a maximum number of pipelines do not share data at all with other pipelines, and such that the number of pipelines that share any particular data are minimized.

Continuing with step 402 of FIG. 4, in the present embodiment, the pipeline structure is formed using a distributed architecture that packages code such that the responsibility is distribute to smaller units (i.e., components) of code. Each one of these software components is responsible for one specific type of transformation. Transformation components can be provided by the developer (e.g., from a monolithic transformation application) or can be user-developed. These transformation components form a base of ready-made elements that are combined to build functionally more sophisticated transformations in the data transportation process.

The transformation components are then coupled together to form the pipeline structure. In the present embodiment, transformation components are combined so as to form multiple pipelines that perform operations on data from data partitions to generate output. Further information regarding the use of coupled transformation components to form pipelines is described in U.S. patent application Ser. No. 09/16,422, titled "METHOD AND ARCHITECTURE FOR AUTOMATED OPTIMIZATION OF ETL THROUGHPUT IN DATA WAREHOUSING APPLICATIONS," which is incorporated herein by reference.

In the present embodiment, step 402 is performed manually by a user. That is, the user manually chooses the transformation components necessary to accomplish the desired data transportation process. The user then manually arranges the selected transformation components to form parallel pipelines. The transformation server then automatically selects the independent tasks to be executed in parallel based on the selected transformation components of each pipeline.

Though the present embodiment illustrates the constructs of pipelines using transformation components that are coupled together, the present invention is well adapted for construction of pipelines using other mechanisms. In one alternate embodiment, pipelines are constructed using a single block of source code that is responsible for all phases of the extraction, transformation and loading processes and that generates pipelines for performing data transformations according to a specific, rigid set of rules.

Referring back to FIG. 4, tasks are then executed in parallel through the pipelines as shown by step 403. The data generated by the pipelines is then stored in a target database as shown by step 404.

Figure 5:
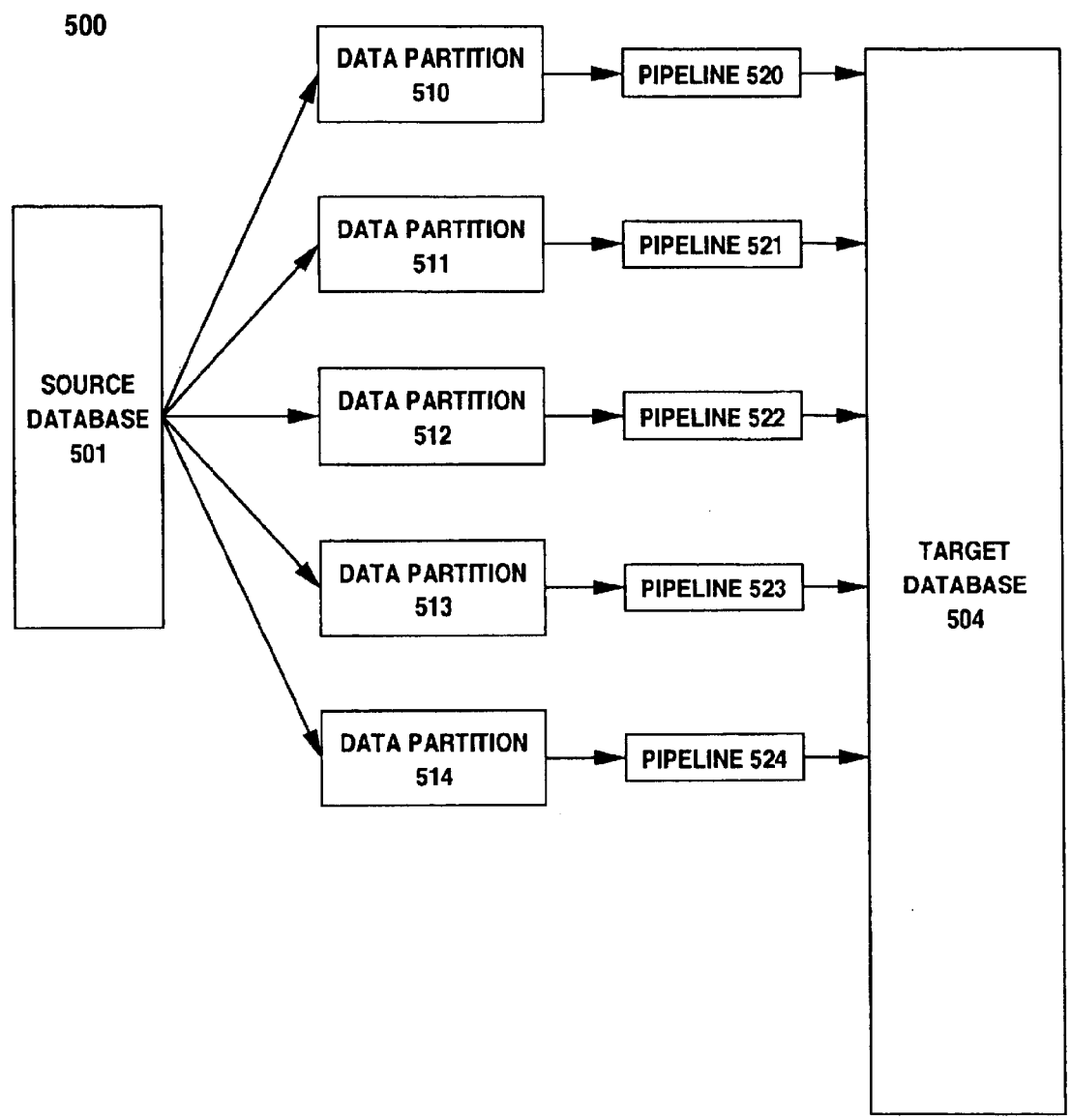
FIG. 5 illustrates an exemplary structure that includes multiple data partitions and multiple independent pipelines of transformation components for transport of data from a source database to a target database in accordance with one embodiment of the present invention.

FIG. 5 shows an exemplary structure 500 that is formed according to method 400 of FIG. 4. Data from source database 501 is partitioned (step 401 of FIG. 4) into data partitions 510–514. Pipelines 520–524 are then constructed (steps 402 of FIG. 4) for performing operations on data contained within data partitions 510–514.

Continuing with FIG. 5, tasks are executed in parallel through pipelines 520–524 (step 403 of FIG. 4) and the results are stored(step 404 of FIG. 4) in target database 504.

Multiple execution threads within ones of pipelines 520–524 perform data transformation functions concurrently. In the present embodiment, execution threads read the data from source database 500 concurrently, followed by concurrent transformation of the data in multiple execution threads, and concurrent loading of data into target database 504 using multiple execution threads. Thereby data contention is reduced and throughput is increased.

Figure 6:
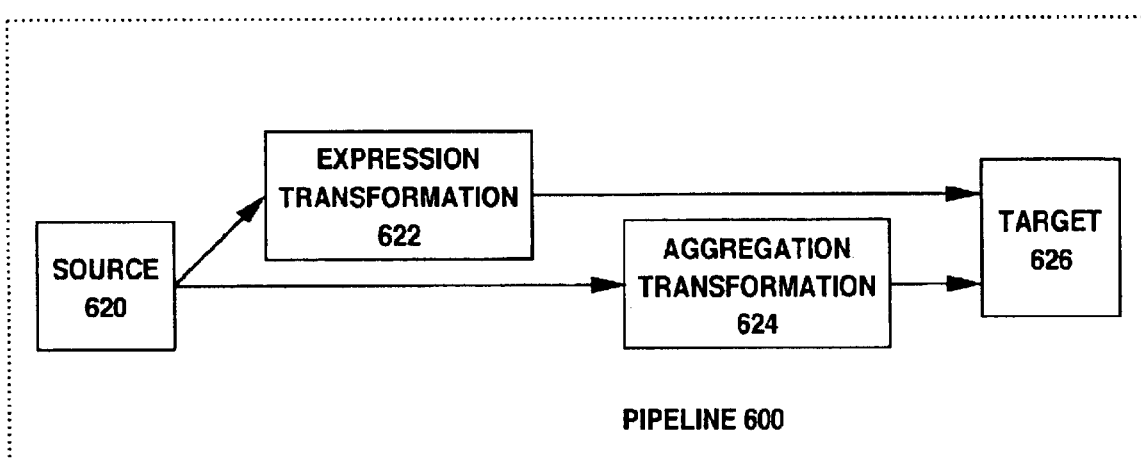
FIG. 6 shows an exemplary pipeline having two transformation components in accordance with one embodiment of the present invention.

FIG. 6 shows an exemplary pipeline 600 that includes, for example, a source table 620, an expression transformation 622, an aggregation transformation 624, and a target table 626. In the present embodiment, source table 620 is a table of partitioned data (e.g., within one of partitions 510–514 of FIG. 5). The expression transformation 622 performs a calculation based on values within a single record from source table 620 (e.g., based on the price and quantity of a particular item, one can calculate the total purchase price for than line item in an order). Next, the aggregate transformation 624 is used to perform an aggregate calculation based on all records passed through the transformation (e.g., one can find the total number and average salary of all employees in a particular office using this transformation). The result is then stored as a record in a target table 626. Target table 626 is a table within a target database (e.g., target database 504 of FIG. 5).

Each transformation component obtains data from one or more of the data partitions and can implement staging (storing) the incoming data fields as it processes these data fields. In the present embodiment, the degree of requisite staging by each transformation component is automatically determined and implemented, without any human intervention. Depending on the nature of the transformation, each transformation component will automatically select the optimal amount of staging. The staging can range continuously from zero staging (also know as streaming) to full staging. A transformation with zero staging is called streaming transformation.

In the currently preferred embodiment, there are thirteen different transformation components: source, target, expression, aggregation, filter, rank, update strategy, sequence, joiner, lookup, stored procedure, external procedure, and normalizer. The source transformation contains tables, views, synonyms, or flat files that provide data for the data mart/data warehouse. The target transformation maintains database objects or files that receive data from other transformations. These targets then make the data available to data mart users for decision support. Expression transformations calculate a single result, using values from one or more ports. The aggregation transformation calculates an aggregate value, such as a sum or average, using the entire range of data within a port or within a particular group. Filter transformations filter (selects) records based on a condition the user has set in the expression. The rank transformation filters the top or bottom range of records, based on a condition set by the user. The update strategy transformation assigns a numeric code to each record indicating whether the server should use the information in the record to insert, delete, or update the target. The sequence generator transformation generates unique ID numbers. The joiner transformation joins records from different databases or file systems. The lookup transformation looks up values. The stored procedure transformation calls a stored procedure. The external procedure transformation calls a procedure in a shared library or in the COM layer of Windows NT. And the normalizer transformation normalizes records, including those read from virtual storage access method (VSAM) sources. In the currently preferred embodiment, the source, target, aggregation, rank, and joiner transformations are all staged transformations. The data generated by these transformations are automatically staged by the software, without human interaction. The expression, filter, update strategy, sequence, lookup, stored procedure, external procedure, and normalizer transformations are all streamed transformations. Other new types of transformations can also be added to this list.

Some transformations require routing to enforce data affinity. For example, aggregation and rank transformations require routing. For these transformations an internal router is created that routes data to a pipeline based on the grouping for the transformation. In one embodiment, individual process threads are assigned to both aggregation and rank transformations. Thus, aggregate transformations run in their own thread boundary and rank transformations run in their own separate thread boundary. This allows for independent processing of aggregation and rank transformations and eliminates the need to re-combine data as is required in prior art processes for performing aggregation and rank transformations, resulting in further improvements in throughput.

Some of the more complex transformations require special processing. For example, joiner and lookup transformations require both synchronization and routing to a cache. In the present embodiment, a cache is created during the partitioning process for both joiner and lookup transformations. In one embodiment, the cache is created on the local memory of the transformation engine server. In the case of a look-up transformation, synchronization is performed and the cache is built serially as data is read into each data partition. Memory within the cache is allocated to each partition. This maintains the non-overlapping structure for data partitions. Processing efficiency is obtained by creating the cache once and using the data in the cache across all data partitions.

In the present embodiment, a deadlock retry function is implemented for each failed transaction. The deadlock retry function reinitiates execution of the tasks that are to be executed within a particular pipeline when an initial failure is encountered. By reinitiating execution of the tasks to be executed within a particular pipeline, failures that result from database deadlocks are avoided.

Each partition runs within its own thread boundary with minimal amounts of shared data between process threads. This yields increased throughput. In addition, because each process thread is assigned to operations that are independent of operations performed by other execution threads, errors due to timing delays, delays in read and write operations, routing errors, and errors resulting from dependent operations are avoided.

Because execution threads read the data from the operational data store concurrently, followed by concurrent transformation of the data in multiple execution threads, and concurrent loading of data into the target data warehouse using multiple execution threads, data transformation time is reduced. Thereby the apparatus and method of the present invention achieves increased throughput.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modification as are suited to the particular use contemplated. It is intended the scope of the invention be defined by the Claims appended hereto and their equivalents.

What is claimed is:

1. A computer implemented method for transporting data in a data warehousing application, comprising the steps of:
specifying at least one source containing data wherein at least some portion of said data is to be transported;
partitioning formerly un-partitioned data from said source containing data so as to form a plurality of non overlapping data portions;
constructing a plurality of pipelines that include transformation components for manipulating data in said data partitions; and
specifying a target for storing data generated by one or more pipelines.

2. The computer implemented method of claim 1 wherein partitioning formerly un-partitioned data further comprises the steps of:
receiving user input that indicates desired data partitioning; and
partitioning data from said source containing data so as to form a plurality of data partitions conforming to said user input.

3. The computer implemented method of claim 2 wherein said data is partitioned by dividing said data evenly into a user-selected number of data partitions.

4. The computer implemented method of claim 1 wherein constructing a plurality of pipelines further comprises the steps of:
constructing a plurality of transformation components for manipulating data in said data partitions; and
coupling the transformation components to form a plurality of pipelines.

5. The computer implemented method of claim 4 wherein coupling of transformation components to form a plurality of pipelines is performed such that at least some of said plurality of pipelines operate using data from a single data partition.

6. The computer implemented method of claim 4 wherein coupling of transformation components to form a plurality of pipelines allows for multiple pipelines to access each of said data partitions.

7. The computer implemented method of claim 1 further comprising the step of:
executing a plurality of tasks in parallel through said plurality of pipelines.

8. The computer-implemented method of claim 6 wherein said data is partitioned such that there is affinity for data within each data partition.

9. The computer-implemented method of claim 6 wherein at least some of said pipelines are independent execution threads.

10. A computer readable medium having stored therein instructions for causing a computer to implement a method for transporting data in a data warehousing application, said method comprising the steps of:
specifying at least one source containing data wherein at least some portion of said data is to be transported;
partitioning formerly un-partitioned data from said source containing data so as to form a plurality of non overlapping data portions;
constructing a plurality of pipelines that include transformation components for manipulating data in said data partitions; and
specifying a target for storing data generated by one or more pipelines.

11. A computer readable medium as described in claim 10 wherein partitioning formerly un-partitioned data further comprises:
receiving user input that indicates desired data partitioning; and
partitioning data from said source containing data so as to form a plurality of data partitions conforming to said user input.

12. A computer readable medium as recited in claim 10 wherein said data is partitioned by dividing said data evenly into a user-selected number of data partitions.

13. A computer readable medium as recited in claim 10 wherein constructing a plurality of pipelines further comprises the steps of:
constructing a plurality of transformation components for manipulating data in said data partitions; and
coupling the transformation components to form a plurality of pipelines.

14. A computer readable medium as recited in claim 13 wherein data is partitioned such that there is affinity for data contained within each data partition.

15. A computer readable medium as recited in claim 13 wherein coupling the transformation components to form a plurality of pipelines allows for coupling of said transformation components such that multiple pipelines can access each of said data partitions.

16. A computer readable medium as recited in claim 10 wherein said method further comprises the step of:
executing a plurality of tasks in parallel through said plurality of pipelines.

17. A computer readable medium as recited in claim 13 wherein said pipelines are formed so as to minimize data sharing between pipelines.

18. The computer-readable medium of claim 13, wherein said transformation components include a source transformation component, a target transformation component, an aggregation transformation component, a rank transformation component, and a joiner transformation component that stage data.

19. The computer-readable medium of claim 13, wherein said transformation components include an expression transformation component, a filter transformation component, an update strategy transformation component, a sequence transformation component, a lookup transformation component, a stored procedure transformation component, an external procedure transformation component, and a normalizer transformation component for streaming data.

20. A method for transporting data in a data warehousing application comprising:

partitioning formerly un-partitioned data from said source containing data to form a plurality of overlapping data partitions;

storing at least some of said partitioned data;

constructing a plurality of pipelines that include transformation components for manipulating data in said data partitions;

coupling said transformation components to form a plurality of parallel pipelines; and executing a plurality of tasks in parallel through said plurality of pipelines; and storing said data generated by one or more of said pipelines in a target database.

21. The method of claim 20 wherein said transformation components are coupled such that said plurality of pipelines correspond to said plurality of data partitions, thereby reducing the amount of sharing of data between individual pipelines.

22. The computer implemented method of claim 21 wherein data affinity factors are used in constructing said plurality of transformation components.

* * * * *